June 1, 1937.  J. GYURIS  2,081,926
PRIMARY ELEMENT
Filed Aug. 23, 1933
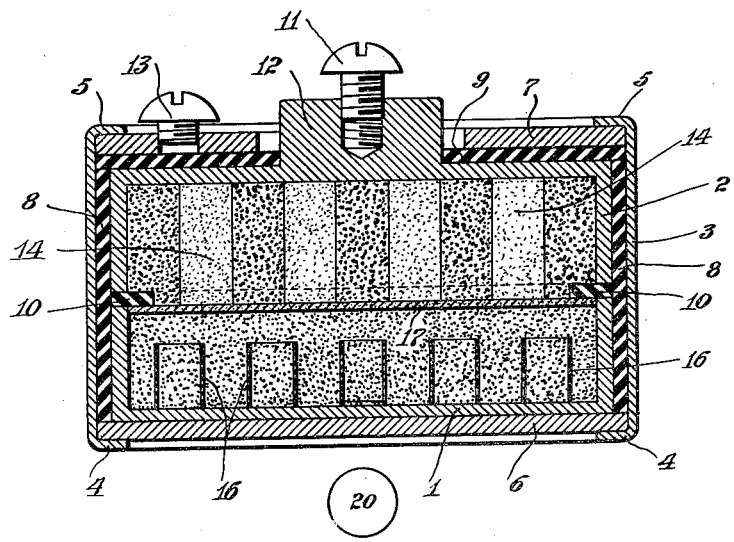
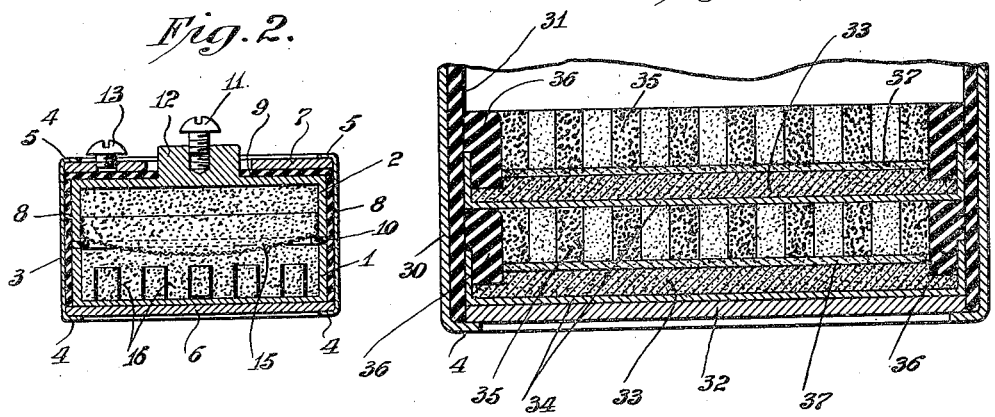
INVENTOR
János Gyuris
BY
ATTORNEY Patented June 1, 1937

2,081,926

UNITED STATES PATENT OFFICE 2,081,926

PRIMARY ELEMENT

Janos Gyuris, Budapest, Hungary

Application August 23, 1933, Serial No. 686,469
In Hungary July 17, 1933

17 Claims. (Cl. 136—83)

The present invention relates to primary elements.

The object of the invention is an element in the form of a sealed cartridge in which the energy produced by a chemical reaction at raised temperatures is obtained as electrical energy. In accordance with the preferred embodiment of the invention, at least one of the reacting substances in the element is present within the temperature range of the reaction in a semi-fluid, fluid or gaseous state, or in a combination state of these phases. The cell is self-contained without any connecting pipes or the like for conducting gases, and when heated, generates current at a higher pressure and in larger quantity than was heretofore practicable.

The drawing illustrates a few practical embodiments of the invention, Figs. 1 and 2 being vertical sectional views of single cell elements, and Fig. 3 a vertical cross-section of a multiple cell element.

In Fig. 1, the anode chamber 1 and the cathode chamber 2, are arranged one above the other with their open ends communicating. Both electrode chambers may consist of iron or any other suitable heat and pressure-resisting material, iron being preferable for reasons of economy. The two electrode chambers 1 and 2 may also consist of a non-conductive heat and pressure resisting material. The electrode chambers are sealed within a cylindrical iron casing 3, the ends of which are bent over at 4 and 5 to clamp the cartridges in place through the agency of a bottom plate 6 and a centrally perforated top plate 7 also of iron. The side walls of the electrode chambers are insulated from the casing 3 by a layer or insulation 8 and an insulating layer 9 separates the top plate 7 from chamber 2. An insulating ring 10 is clamped between the edges of the two chambers. Through a binding post 11 in a boss 12 connection may be established with the chamber 2, and a binding post 13 in the top plate 7 establishes connection through the top plate, the casing 3 and the bottom plate 6 with the chamber 1.

In the preferred embodiment of the invention the anode cartridge 1 contains $MnO_2$, e. g., pyrolusite, which has been pressed into the chamber at a pressure of approximately 1000–1500 kgs. per $cm.^2$. If the $MnO_2$ is slightly moistened or if the electrode is formed at a temperature of about 400° C., then a pressure of 200–1000 kgs. per $cm.^2$ will be sufficient. This heating temperature is preferably slightly in excess of the melting point of the activating substance mixed with the $MnO_2$ to be hereinafter described. I have found that in this embodiment of the invention, if the anode substance is compacted to a lesser or greater extent, then the life of the battery is shortened or the current output lowered. Besides, if the $MnO_2$ is insufficiently compressed, the reaction would be too violent when the element with a sodium cathode or the like is heated to its operating temperature. I have found that the compactness of the anode tablet may be enhanced to good advantage by mixing some (up to 20%) borax or water glass with the $MnO_2$. Generally speaking, the anode substance is compressed not only for the purpose of saving space, but also to prolong the life of the cell. With increased compression of the anode substance, increased utilization of the cathode substance is insured. Care must be taken, however, that one does not carry this to a point where the reaction between anode and cathode is slowed down to a point where the intensity of the current becomes too small. The compactness of the anode, together with the metallic inlays, wire gauzes, insulating shields, etc., to be hereinafter described more in detail, insure that the reaction be controllable at will.

The cathode cartridge 2 contains metallic sodium preferably in tablet form. As soon as heat is applied to the system, the sodium begins to melt and diffuses slowly into the anode chamber, where a chemical reaction takes place between the two reacting substances. The liberated energy may be withdrawn from the system in the form of electrical energy at the electrode terminals 11 and 13.

Since the sodium slowly migrates into the anode chamber 1 and therefore gradually recedes from the cathode terminal, the contact between the sodium and its cartridge may be broken. In order to avoid this, the sodium tablets are preferably perforated and the perforations are filled with iron filings 14. After the element is exhausted the cathode chamber 2 is empty except for the remaining columns or bars 14 of the iron filings which originally filled the perforations of the sodium tablet. Instead of the iron filings, any other suitable conductive material may be used, such as other metal filings, coarse grain carbon, etc., and its arrangement is also subject to numerous variations. As shown in Fig. 2, a metal wire gauze, for instance, a copper wire gauze 15, may be embedded in the sodium in contact with the cathode chamber, and thus serve the same purpose as the iron column 14. The conducting inlay in the sodium may, of course, be provided in any other suitable manner. The copper or other metal wire gauze 15 must be of sufficient size so as to allow for the expansion of the $MnO_2$ tablet during operation. In the embodiment shown in Fig. 1, the columns made up of iron filings are sufficiently resilient to allow such expansion.

The means for heating the battery is indicated at 20. The nature of the heat source and the association of the battery therewith is subject to endless variations. The cell need not be continuously heated, provided its mass is capable of storing heat and is properly insulated.

In order to reduce the internal resistance of the highly compressed $MnO_2$ and to obtain contact between the mass of $MnO_2$ and the enclosing cartridge or other terminal over a large area, a copper grid 16 is placed in the anode chamber 1 before the same is charged with the $MnO_2$. Other grids of conductive materials such as other metals, may be used instead. The provision of a conductor within the body of the $MnO_2$ tablet serves also more uniformly to distribute heat therethrough.

On account of the sometimes rather violent reaction between the anode and cathode materials, it is desirable, though not necessary, to exercise a certain control over the reaction by slowing down the migration of the cathode substance with the aid of a control sheet 17. This may consist of ordinary cement or any other suitable porous material of less than 1 mm. thickness which will not melt within the temperature range of the reaction and which is not affected by the Na. The wire mesh 15 of Fig. 2 partly fulfills this requirement.

I have found that the anode material may be advantageously activated with $NaNO_3$. The percentage of $NaNO_3$ may be varied and it may also be replaced by other substances of an oxidizing character such as the higher oxides and peroxides of the elements of the 5th, 6th, 7th and 8th group of the periodic system, provided they are solid, semi-fluid or fluid, but not gaseous at ordinary temperatures (below 60° C.), acids and salts deriving from these oxides and peroxides. Satisfactory results were obtained with metallic salts such as nitrates, nitrides, chlorides, chlorates, sulfites, sulfides, sulfates, tellurates, selenates, and finally, certain metals like Te, Se, etc. Variations of between 1-50 per cent. of the activator have been tested, but in the case of $NaNO_3$ a 20% mixture was found most efficient.

An element like the one shown in Fig. 1 and containing 4.8 gr. $MnO_2$, 1.2 gr. $NaNO_3$ and 1.5 gr. Na, will yield an E. M. F. of from 2 to 2.9 v. and a normal E. M. F. of 2.5 v. The overall height of this cell is 15 mm. and its diameter is 27 mm. The capacity of the cell is approximately 1.5 watt-hours when heated to a temperature of approximately 300 to 450° C. The cell is self-contained, i. e., no gases or other substances need be supplied to it during operation, is absolutely dry, and its shelf life is practically indefinite. Accidental short-circuits cause no appreciable harm.

By connecting a plurality of such cells in series or in parallel, or by connecting them in series-parallel, obvious variations are obtainable. A battery built up of a plurality of cells in series is shown in Fig. 3 in which two cells are shown of a battery containing any desired number of cells. A cylindrical casing 30, an insulating lining 31 and a bottom plate 32 are like the ones shown in Fig. 1. A compressed anode tablet 33 of $MnO_2$ and $NaNO_3$ is pressed within an iron cup 34 open at the top. Within the rim of up 34 is seated a ring of insulating material 36 which holds in place and insulates from cup 34 the cathode cartridge 35 like the one shown in Fig. 1. Preferably, the insulating ring 36 and the anode tablet 33 are formed in one operation. The cup 34 may be of very thin material, roughened to insure good contact with the anode tablet. The electrodes are separated by diaphragm 37 corresponding to 17 of Fig. 1. On top of this there is a second cell consisting of an anode and a cathode cartridge, and the assembly is repeated until an element of sufficient potential is built up. The top of the battery is closed off like the bottom.

An alternative embodiment of the invention comprises the admixture of certain substances to the anode material which will temporarily effect a higher E. M. F. Such a substance, for instance, is $PbSO_4$. An addition of approximately 10% $PbSO_4$ to the above mentioned mixture (80% $MnO_2$ and 20% $NaNO_3$) produces satisfactory results. Various other substances may be substituted for the $PbSO_4$, such as sulfur, selenium and tellurium containing compounds. Elements containing such substances have an E. M. F. up to 3.5 v.

Numerous tests have been conducted to determine substitutes for the $MnO_2$ as anode material. To this class belong the lower and higher oxides of elements capable of forming different oxidation stages, acids and salts deriving therefrom and certain elements capable of forming electro-negative ions, such as Te, Se, etc. With Te, Se, S, sulfur compounds, etc., iron, carbon or other conducting powder or the like which are neutral with respect thereto, should be distributed in the body of the anode substance to cooperate in the control of the reaction with the cathode substance and to maintain good contact between the anode and cathode substances.

Good results have been obtained with cathodes of other alkali metals and alkali metal compounds that are of an equal or better reducibility than Na. They need not be in pure condition and amalgams and alloys thereof sometimes improve the contact surface.

Obviously, the operating temperature of the battery may have to be varied, depending on the nature of the anode and cathode substances used and on the electric current requirements.

The above and further alternative combinations indicate in general that at least some of the advantages of my invention may be obtained with an anode material consisting of a substance or substances capable of being reduced, thus liberating a positive charge by means of an oxidizing or similar parallel reaction with the cathode substance at raised temperatures, and a cathode material consisting of a substance or substances capable of being oxidized or capable of a parallel reaction, thus liberating a negative charge by means of a reducing reaction with the anode substance at raised temperatures. By raised temperature I mean a temperature at which one of the reacting substances, being solid at ordinary temperatures, is in a semi-fluid, fluid or gaseous condition, or in a combination of these phases. Tests conducted with cells where none of the reactive substances was of the above mentioned nature gave unsatisfactory results from a practical or economical standpoint. For instance, an element having an anode of $MnO_2$ and a cathode of Fe, when heated to 400° C.

gave an E. M. F. of a fraction of a volt and had a life of a few minutes. Best results are obtained if one takes care in selecting the reacting substances in such a manner that the finally produced reaction product is present in such a form that it will not bar the further operation of the element. If, for instance, magnesium is used as one of the constituents, then after a brief period of satisfactory operation, the generation of current is terminated, probably owing to the formation of magnesium oxide or similar reaction products.

The current intensity obtained from the cell may be materially increased by accelerating the reaction between the cathode and the anode materials by placing one or both substances under pressure. For this purpose it may be necessary to provide outside connections and in this respect sacrifice one of the important advantages of my cell.

While I have illustrated a few mechanical assemblies which I have found commercially practicable, in this respect also my invention is subject to a large variety of embodiments which will be apparent to those skilled in the art and particularly in the construction of dry cells and the like. Besides, the appearance and mechanical construction of my battery and the manner in which connections are established therewith are, to a certain extent, dependent on the use to which it is put.

What I claim is:

1. In an electric element, an iron container enclosing two iron cartridges open on one side and facing one another with their open sides, insulation separating the edges of said cartridges, a mixture of approximately eighty per cent $MnO_2$ and twenty per cent $NaNO_3$ compacted at a pressure of approximately 1000–1500 kgs. per cm.$^2$ in the first one of said cartridges, a copper ribbon embedded in the compacted mixture and contacting therewith over a large surface connected with said first cartridge, sodium in the second cartridge, spaced bars of compacted iron powder extending from the bottom of the second cartridge to its open top, the sodium occupying the space between said bars, a thin porous insulating shield between the adjacent open faces of said cartridges, insulation between the side walls of said cartridges and said container, a binding post connected with said second cartridge, and a binding post connected with the first cartridge through said container.

2. In an electric element, a metal container enclosing two metal cartridges open at one side and facing one another with their open sides, insulation separating the edges of said cartridges, a compressed mixture of approximately eighty per cent $MnO_2$ and twenty per cent $NaNO_3$ in the first one of said cartridges, a conductor embedded in the compacted mixture and contacting therewith over a large surface connected with said first cartridge, sodium in the second cartridge, a conductor embedded in the sodium and contacting with the second cartridge, a thin porous shield between the adjacent open faces of said cartridges, insulation between said second cartridge and said container, a binding post connected with said second cartridge, and a binding post connected with the first cartridge through said container.

3. In an electric element, a metal container enclosing two metal cartridges open on one side and facing one another with their open sides, insulation separating the edges of said cartridges, a compacted mixture of approximately eighty per cent $MnO_2$ and twenty per cent $NaNO_3$ in the first one of said cartridges, a conductor embedded in the compacted mixture and contacting therewith over a large surface connected with said first cartridge, sodium in the second cartridge, a porous conducting shield between the adjacent open faces of said cartridges and contacting with the second cartridge, insulation between said second cartridge and said container, a binding post connected with said second cartridge, and a binding post connected with the first cartridge through said container.

4. In an electric element, a cathode of sodium, an anode of $MnO_2$, and connections to said anode and cathode including a metallic grid embedded in said $MnO_2$, and columns of metallic filings in said sodium.

5. In an electric element, the combination which comprises a fused alkali metal cathode and a dry anode substance capable of releasing oxygen and reacting with said cathode to produce electrical energy at temperatures at which at least one of said substances is fused.

6. In an electric element, the combination which comprises a metallic sodium cathode and a dry anode substance capable of releasing oxygen and reacting with said cathode to produce electrical energy at temperatures at which at least one of said substances is fused.

7. In an electric element, the combination which comprises a metallic sodium cathode and a dry anode substance including peroxide of manganese capable of releasing oxygen and reacting with said cathode to produce electrical energy at temperatures at which at least one of said substances is fused.

8. In an electric element, the combination which comprises a metallic sodium cathode and a dry anode substance including sodium nitrate capable of releasing oxygen and reacting with said cathode to produce electrical energy at temperatures at which at least one of said substances is fused.

9. In an electric element producing electrical energy by means of thermo-chemical action, the combination which comprises a dry, fused alkali metal cathode in a metallic condition, and a dry anode substance capable of releasing oxygen at a fusion temperature of said cathode substance.

10. In a thermo-chemical primary element, the combination which comprises a dry cathode of an alkali metal in metallic condition, a dry anode of a substance capable of giving off oxygen at a fusion temperature of said alkali metal, and means for maintaining the temperature of said anode and cathode above the melting point of said alkali metal.

11. In an electric element producing electrical energy by means of thermo-chemical action, the combination which comprises two directly reacting anhydrous substances incapable of reacting with each other at temperatures below their melting points, one of said substances being a cathode of a fused alkali metal, the other of said substances being an anode substance capable of releasing oxygen at the fusion temperature of said alkali metal.

12. In an electric element producing electrical energy by means of thermo-chemical action, the combination which comprises two directly reacting anhydrous substances incapable of reacting with each other at temperatures below their melting points, one of said substances including metallic sodium, the other of said substances being an anode substance including peroxide of manganese.

13. In an electric element producing electrical energy by means of thermo-chemical action, the combination which comprises two directly reacting anhydrous substances incapable of reacting with each other at temperatures below their melting points, one of said substances including metallic sodium, the other of said substances being an anode substance capable of releasing oxygen at a temperature of fusion of said sodium.

14. In an electric element, the combination which comprises a container, a diaphragm dividing said container in two compartments, an anhydrous and metallic cathode substance in one of said compartments, and an anhydrous oxygen-bearing substance in the other of said compartments, said substances being stable at normal temperatures and being capable of directly reacting with each other and of generating electrical energy at temperatures above the temperature of fusion of at least one of said substances, said cathode substance including an elementary alkali metal, and said anode substance including $MnO_2$ and an admixture of an activating material.

15. In an electric element, the combination which comprises a container, anhydrous cathode and anode substances within said container, said cathode and anode substances being normally inactive and being capable of directly reacting with each other and of generating electrical energy at a temperature at which at least one of said substances is fused, said cathode substance including metallic sodium, and said anode substance including a compound releasing oxygen at the temperature of fusion of said alkali metal.

16. In an electric element, the combination which comprises a container, anhydrous cathode and anode substances within said container, said cathode and anode substances being normally inactive but being capable of directly reacting with each other and of generating electrical energy at a temperature at which at least one of said substances is fused, said cathode substance including metallic sodium, and said anode substance including peroxide of manganese and an admixture of $NaNO_3$.

17. In an electric element, the combination which comprises a container, a foraminous partition wall dividing said container in two compartments, a cathode of an anhydrous and elementary alkali metal in one of said compartments, an anode of a compressed oxygeniferous substance in the other of said compartments, said substances being normally inactive and being capable of directly reacting with each other and of generating electrical energy when heated to temperatures above 250 degrees centigrade.

JANOS GYURIS.